United States Patent [19]

Georgel et al.

[11] Patent Number: 4,808,254

[45] Date of Patent: Feb. 28, 1989

[54] METHOD FOR ASSEMBLING THE CONSTITUTIVE ELEMENTS OF AN ANTENNA REFLECTOR

[75] Inventors: Jean Georgel, Boulogne; Jacques Monvoisin, Argenteuil; Valdo Trubert, Poissy, all of France

[73] Assignee: Thomson CSF, Paris, France

[21] Appl. No.: 868,670

[22] Filed: May 30, 1986

[30] Foreign Application Priority Data

May 30, 1985 [FR] France ................. 85 08164

[51] Int. Cl.⁴ ............................................. B32B 31/04
[52] U.S. Cl. ...................................... 156/245; 156/295; 156/305; 343/912
[58] Field of Search ............... 156/245, 242, 295, 305, 156/296; 343/755, 912, 916, 897, 832

[56] References Cited

U.S. PATENT DOCUMENTS

| | | | |
|---|---|---|---|
| 2,922,161 | 1/1960 | Ball | 343/912 |
| 3,964,071 | 6/1976 | Townes, Jr. et al. | 343/840 |
| 4,439,774 | 3/1984 | Johnson | 343/912 |

FOREIGN PATENT DOCUMENTS 1435472  3/1966  France .

*Primary Examiner*—Caleb Weston
*Attorney, Agent, or Firm*—Cushman, Darby & Cushman

[57] ABSTRACT

A method of assemblying an antenna having an interlocking support structure with interlocking nodes, and a meshed radiation mirror includes positioning the support structure in a horizontal position, placing the mirror over the horizontally positioned support structure, and pushing glue through the meshes of the mirror to adhere the meshes to adjacent edges of the interlocking support structure. A second embodiment positions a mold in a horizontal position, the mold having a surface form corresponding to a predetermined form of the antenna mirror. Then, the mirror is positioned on the mold surface form. Glue is placed on the edges of the support structure, and the support structure is then deposited on the mirror with the glued edges contacting the mirror. To assemble the support structure, molds are placed around each and every interlocking node. Glue is then forced into the mold to secure the interlocking node.

5 Claims, 3 Drawing Sheets

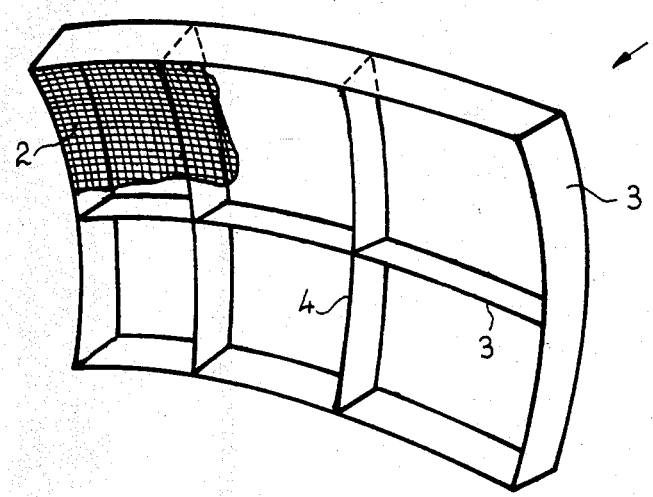
FIG_1
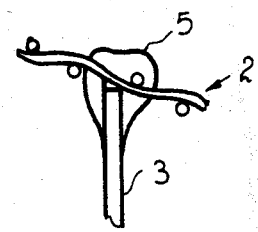
FIG_2
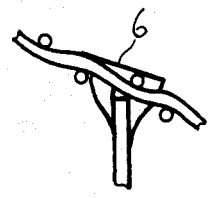
FIG_3
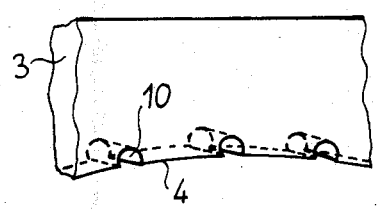
FIG_4
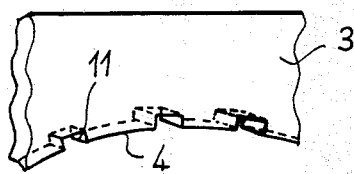
FIG_5

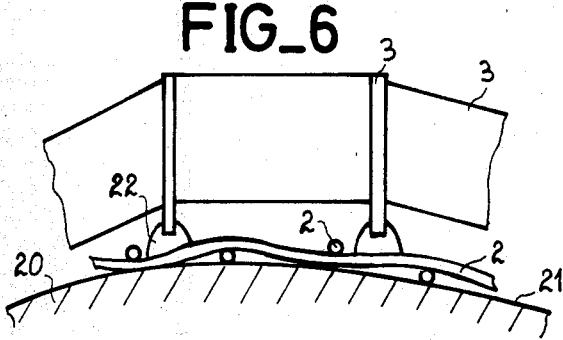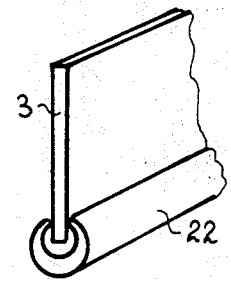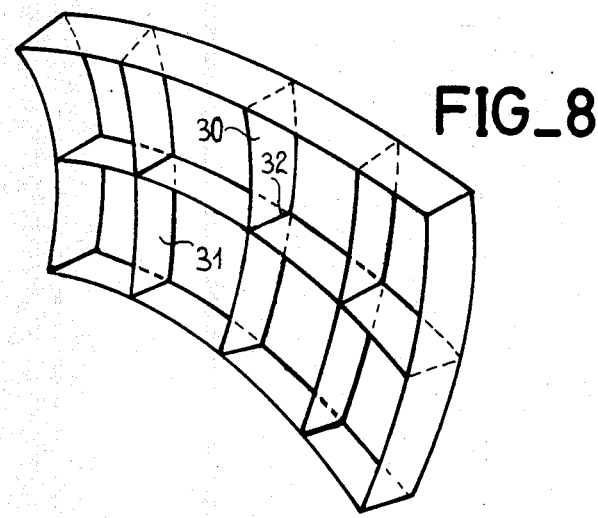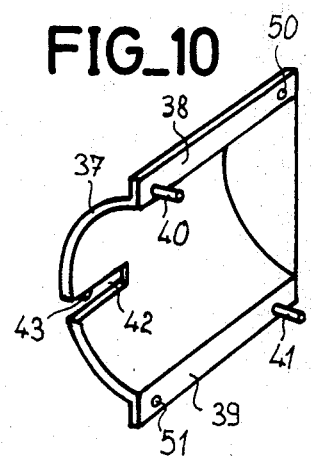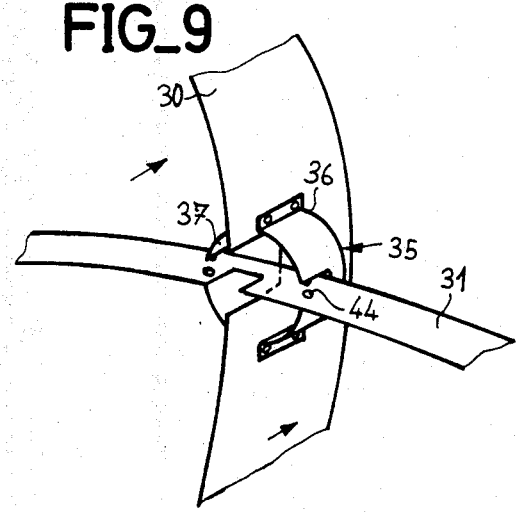

FIG_11
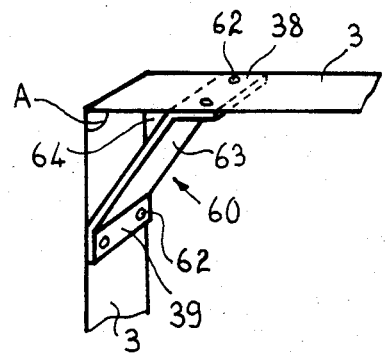
FIG_12
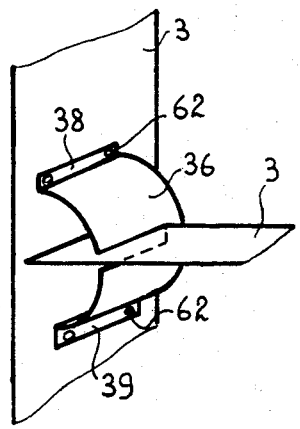

METHOD FOR ASSEMBLING THE CONSTITUTIVE ELEMENTS OF AN ANTENNA REFLECTOR

BACKGROUND OF THE INVENTION

1. Field of the invention

The present invention concerns methods for assembling the constitutive elements of an antenna reflector, and more particularly, methods for securing these elements with respect to one another.

2. Description of the prior art

Antenna reflectors generally comprise a fixed carrier structure having a predetermined shape, upon which is placed a metallic mirror, the mirror forming a surface for reflecting waves.

The mirror is generally constituted by a material known as an air transparent material, i.e. a material which has very little wind resistance and which is generally produced in the form of a grid plate or expanded metal. Its form determines the radiation characteristic of the antenna; this is the reason why it must be shaped very accurately. The carrier structure is formed of metal sheets conventionally known as "combs" or "ribs", these metal sheets corresponding in shape to the rear section of the mirror. They can either be assembled together n order to form a resistant framework or be secured in position by another resistant framework formed of brackets or grating that supports the whole.

The methods for assembling the elements of the carrier structure such as the metal plates supporting the mirror generally comprise performing a riveting or a screwing or soldering in order to secure these metal plates with respect to one another. The assembling method of the mirror upon this structure conventionally comprises performing a riveting and using flat cover-plates or in using spring staples or also in welding the mirror onto the structure.

The main drawback of these methods results from the fact that pressures are exerted on the elements and especially upon the mirror when the staples or the rivets are placed in position. These pressures provoke deformations of the mirror which modify the radiation characteristics of the antenna. When the elements are assembled by welding, the thermal stresses exerted during the welding operation will cause undesirable deformations of the mirror.

SUMMARY OF THE INVENTION

An object of the present invention is to overcome these drawbacks by providing a method for assembling the constitutive elements of the reflector mainly characterized in that these elements are assembled by gluing.

BRIEF DESCRIPTION OF THE DRAWINGS

Other features, objects and advantages of the present invention will become apparent from the following description given by way of non-limitative example and with reference to the appended drawings wherein:

FIG. 1 shows an antenna reflector obtained by a first embodiment of the method of assembly according to the invention;

FIGS. 2 and 3 show details of a method of gluing applied to the combs according to FIG. 1;

FIGS. 4 and 5 show two embodiments of sections of combs;

FIG. 6 illustrates an embodiment of the assembly method according to the invention;

FIG. 7 shows an embodiment detail of a wick according to FIG. 6;

FIG. 8 shows a carrier structure built up in accordance with the method of the invention;

FIG. 9 shows the detail of assembling the combs at an intersection or node;

FIG. 10 shows a particular embodiment of a mold for assembling the node according to FIG. 9;

FIGS. 11 and 12 show a particular embodiment of the molds for assembling the combs at the periphery of the structure.

DESCRIPTION OF THE PREFERRED EMBODIMENTS

FIG. 1 represents an antenna reflector, the main elements of which are a frame 1 and a mirror 2, the mirror being partially represented in this drawing. Frame 1 is constituted by an assembly of metal sheets 3 classically known as combs or ribs. These combs are disposed with respect to one another in a manner known per se that provides a rigid support able to support the mirror and to resist the stresses imposed by the environment or surroundings, especially atmospheric stresses. The front section 4 of these combs is obtained in a very accurate manner through classical methods so that the mirror may be applied directly onto these profiled sections and it thus has the appropriate form providing the desired radiation diagram of the antenna.

Mirror 2, which has been represented, is constituted in this particular embodiment by a grid, this mirror being directly applied upon the front sections of the combs that confer thereupon the required form.

According to a first embodiment that is especially adapted to the use of a grid, the glue is applied by the front, i.e. by the face that reflects the waves. The glue is pushed forward through the meshes of the mirror by using, for example, a gun (not represented) in order to coat at the same time the edge of the comb and the meshes of the mirror. The metal structure that supports the mirror rests, for example, on a horizontal plane throughout the whole duration of gluing, so that the mirror does not change position. Prior to the hardening or setting of the glue, the glue overflowing the mirror is levelled off, for example by using a spatula; after the hardening of the glue, the grid plate adheres perfectly to the combs and constitutes an assembly having great rigidity and withstanding the stress conditions imposed.

FIGS. 2 and 3 partially represent a transversal cross-section of a rib, the grid also being seen from the side. When the glue is injected by using a gun, it presents the form of an accumulation 5 which is spread out over the surface above the mirror 2 and at the rear around the comb 3. Prior to hardening of this glue a levelling off is performed by using a spatula in order to obtain a plane surface 6, such as shown in FIG. 3. On the external edges of the mirror levelling off the surface is performed, as well as, on the perimeter of the grid plate in the case where the grid plate does not extend beyond the external ribs of the frame.

The section 4 of the ribs 3 receiving the grid can have a smooth contour. It can also, according to an alternative embodiment, comprise regularly disposed notches extending along the length of this section. The notches can have a cylindrical parallelepipedic form, such as represented respectively on FIGS. 4 and 5, these notches providing improved adherence of the glue to the sections of the combs.

FIG. 6 represents a second embodiment of the assembling method according to the invention. This second method utilizes a mold 20 that has a surface the form of which is identical to that required to confer upon the reflector. This FIG. 6 represents a partial cross-section of the reflector placed on the mold 20. The mirror 2 is thus positioned on the mold 20, this mold being covered with a very thin membrane, which is anti-adhesive.

The section of the ribs does not need to have very great precision in this embodiment since the precision of the contour to be produced upon the mirror is conferred by mold 20. The process for obtaining the mold is carried out by classical molding methods. The wicks 22, made for example from glass fibers are covered with glue and are first of all placed on the section of each comb 3. The structure thus equipped is deposited on the mirror 2, the wicks 22 coated with glue confining the wires of the mirror. After hardening of the glue, the mold can be withdrawn without any difficulty, its surface having been covered by the anti-adhesive membrane 21, constituted, for example, by an anti-adhesive film or varnish.

The first embodiment applies more particularly to large surface reflectors and to mirrors in which the grid or expanded metal is sufficiently transparent for the glue to penetrate and reach the combs located to the rear of the mat formed by this mirror.

The second method is more particularly adapted for mirrors having limited dimensions, but for which it is necessary to have very high precision of the contour or curvature formed by this mirror, although, said second method can apply to mirrors of all kinds, i.e. mirrors constituted by grid plates, by expanded metal, perforated metal sheets or full metal sheets.

FIG. 8 schematically represents a carrier structure that comprises vertical combs 30 and horizontal combs 31 interlocked with respect to one another, so as to form a stiff structure. Each interlocking unit forms a node 32.

The method according to the invention also consists in gluing the combs together, at the site which they interlock or where they form nodes 32.

FIG. 9 represents the detail of a node formed by interlocking two combs 30, 31. The method thus consists in injecting glue into this interlocking area. In order to do this, a mold 35 constituted of two parts 36, 37 is used which allows it to be secured onto the combs surrounding the node 32 so as to constitute a recess into which the glue can be injected.

The mold 35 is present in the form of two semi-cylinders 36, 37 both closed at the same end. Each semi-cylinder, such as the semi-cylinder 37 represented in FIG. 10, comprises two lugs 38, 39 extending along the length of the two edges defining the semi-cylinder.

Lugs 38 and 39 comprise respectively a finger 40 and 41 and respectively a hole 50, 51. Finger 40 is placed at one end of lug 38 and hole 50 at the other. Finger 41 is placed at one end of lug 39 and hole 51 is placed at the other end opposite with the hole and the finger of lug 38. For the other half-mold (not represented) the positions of fingers 40, 41 and holes 50, 51 are inverted. The lugs provided with fingers in fact secure the semi-molds on either side of one of the two combs (for example, the comb 30), that comprise holes adapted to receive these fingers 40, 41. Therefore, when the two parts of the mold are placed on either side of this comb, these two parts constitute a recess closed around the node, such as that represented in FIG. 9.

The two parts of the mold 35 possess a slot 42 that allows entry of the other comb (comb 31). The section of the combs is engaged inside the slots 42 and is blocked by means of a resilient boss 43 that is housed within a hole 44 for this purpose on the opposite side of the comb.

FIG. 11 represents a mold 60 allowing the gluing of two combs forming an angle between them at the periphery of the structure. This mold comprises two fastening lugs 38 and 39 that allow it to be secured during gluing, respectively on the horizontal comb and on the vertical comb that form the angle A. These lugs are secured by means of screws tightened by using nuts 62. It comprises a plate 63 and a plate 64 (placed on the rear plane of FIG. 11) integral between each other which constitute an angle cavity into which the glue can be injected.

FIG. 12 represents a mold allowing the gluing of two combs forming two angles between them at the periphery of the structure. This mold is constituted by a semi-mold 36 such as described in FIG. 10. The means for securing the mold are constituted by screws tightened by nuts 62.

The glues selected are glues that are mechanically resistant, have a good coefficient of viscosity and have a good aptitude.to ageing.

For assembling the mirror on the carrier structure, it is for example possible to use a Redux 410 ® type resin commercially available from CIBA GEIGI, and for assembling the elements of the carrier structure, it is possible to use for example a CY 219 ® type resin, also commercially available from CIBA GEIGI.

We claim:

1. A method of assembling an interlocking antenna support structure having a plurality of interlocking nodes, comprising the steps of:
positioning a cylinderical mold around each of a plurality of selected ones of said interlocking nodes; by, for each cylindrical mold:
   (a) positioning a first half-cylinder mold portion on a first support structure member, a slot in said first half-cylinder mold portion engaging a second support structure member substantialy perpendicular to said first support member; and
   (b) positioning a second half-cylinder mold portion on said first support member on an opposite side of said first support member from said first half-cylinder mold portion, said second half-cylinder mold portion havign a slot which engages said second support member; and
injecting a glue into each said node.

2. A method according to claim 1 wherein the step of positioning said first half-cylinder mold portion includes the step of positioning a first half-cylinder mold portion having a first finger and a first hole, said first finger protruding through said first support structure member, and wherein said step of positioning said second half-cylinder mold portion includes the step of positioning a second half-cylinder mold portion having a second finger and a second hold, said second finger protruding through said first support structure member and engaging said first hole, said first finger protruding through said first support structure member and engaging said second hole.

3. A method according to claim 1 wherein said step of positioning said first half-cylinder mold portion includes the step of securing said first half-cylinder mold portion to said first support structure member with screws, and wherein said step of positioning said second half-cylinder mold portion includes the step of securing said second half-cylinder mold portion to said first support member with screws.

4. A method of assembling an interlocking antenna support structure having a plurality of interlocking nodes, comprising the steps of:

positioning a mold around each of said interlocking nodes, including: positioning a half-cylinder mold portion on a first support structure member, a slot in said half-cylinder mold portion engaging a second support structure member substantially perpendicular to said first support member, said first support member being at a peripheral edge of said support structure; and injecting a glue into each said node.

5. A method according to claim 4 wherein said positioning ttep includes the steps of fixing said half-cylinder mold portion to said first support structure member with fixing means.

* * * * *